United States Patent [19]
Sergoyan et al.

[11] Patent Number: 4,930,137
[45] Date of Patent: May 29, 1990

[54] INORGANIC TRIPLE POINT SCREEN

[76] Inventors: Edward G. Sergoyan, 18716 198th Ave., NE., Woodinville, Wash. 98072; Michael von Dadelszen, 11811 103rd Ave., NE., Kirkland, Wash. 98034

[21] Appl. No.: 268,736

[22] Filed: Nov. 8, 1988

[51] Int. Cl.$^5$ .............................................. H01S 3/097
[52] U.S. Cl. ..................................... 372/81; 313/313; 372/83; 372/87
[58] Field of Search ............................ 372/81, 83, 87; 313/313

[56] References Cited

U.S. PATENT DOCUMENTS 4,686,682 8/1987 Haruta et al. ...................... 372/87

Primary Examiner—James W. Davie
Attorney, Agent, or Firm—Seed and Berry

[57] ABSTRACT

A triple point screen which electrically insulates the high voltage electrode in the discharge region of a gas discharge laser system. The screen is formed from an inorganic dielectric to withstand the corrosive atmosphere of the gas discharge laser. The triple point screen has a grounded conductive metal screen molded into the dielectric and positioned close to the triple point of the anode to substantially reduce the strength of the electric fields at the triple point.

10 Claims, 4 Drawing Sheets

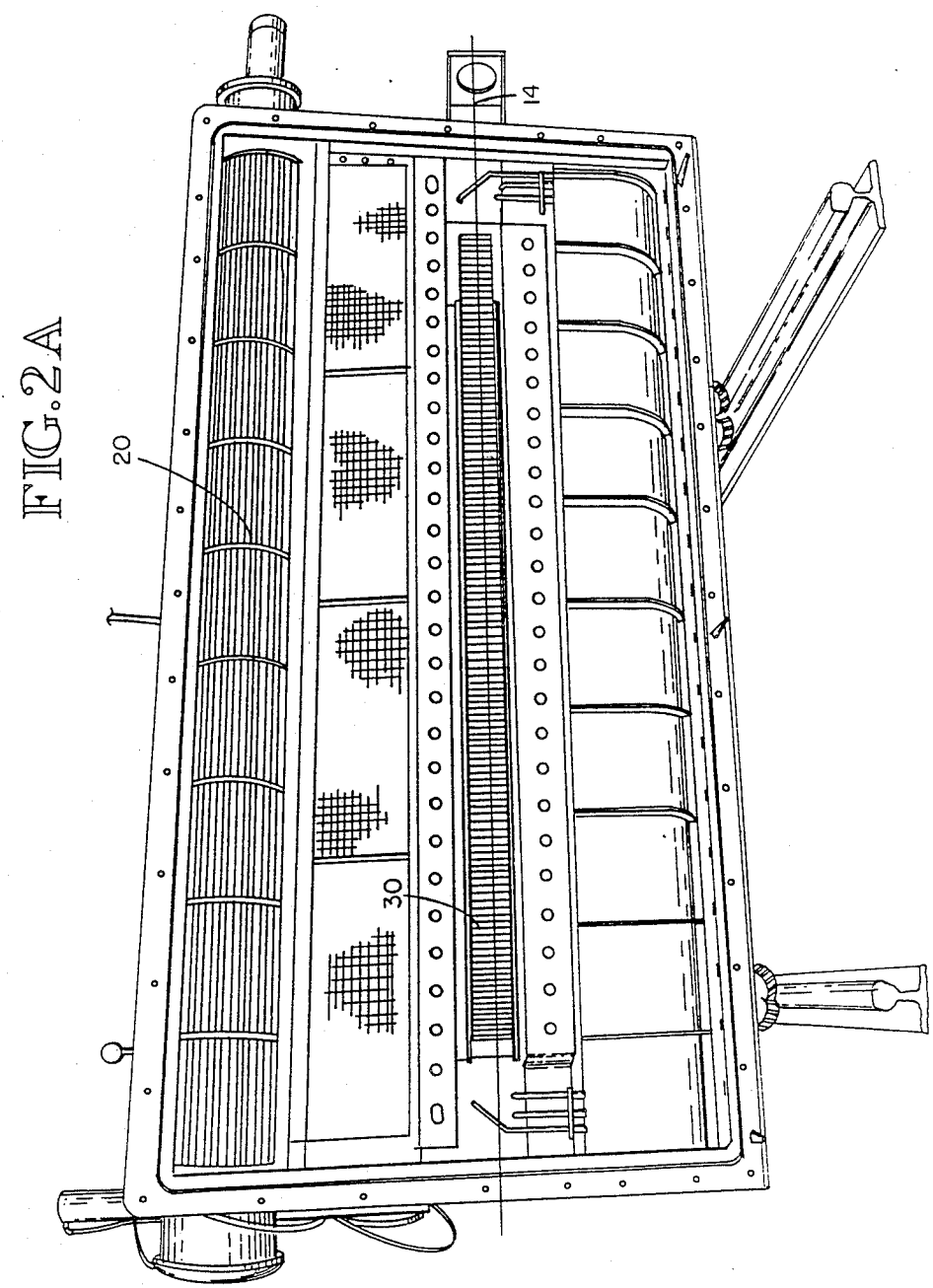

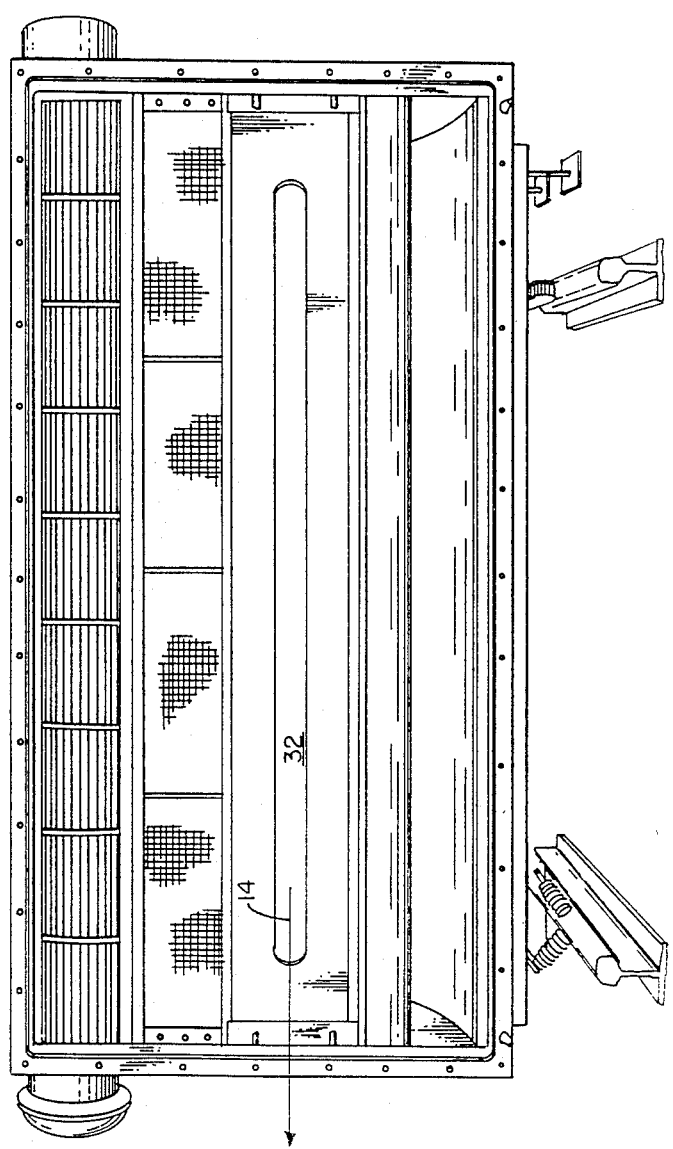

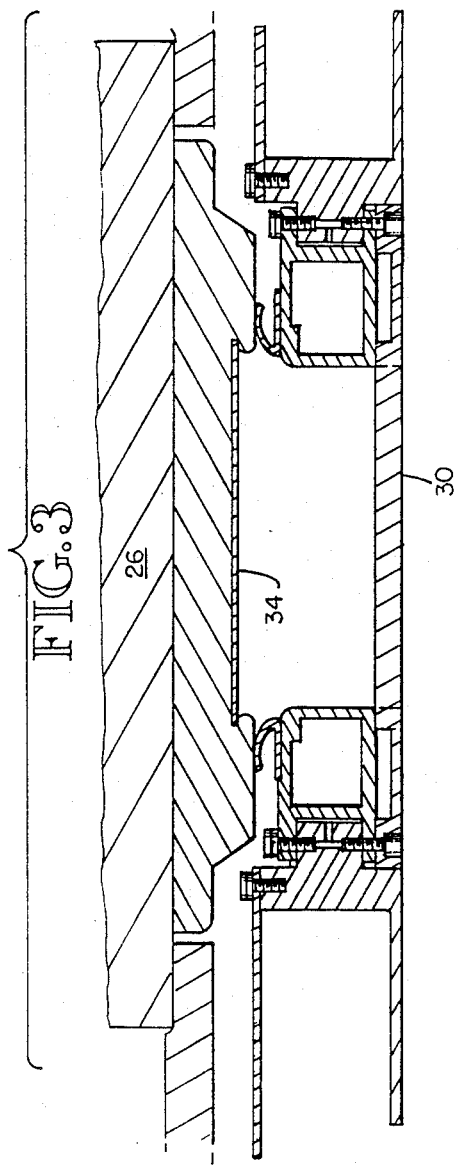
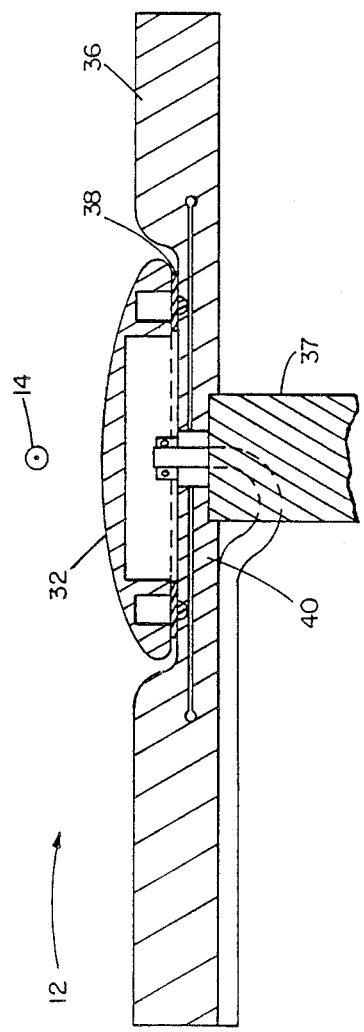

INORGANIC TRIPLE POINT SCREEN

DESCRIPTION

1. Technical Field

This invention relates to high voltage discharge systems, and more particularly, to a high voltage electrode made from an inorganic material and incorporating a screen for reducing electric field intensity near the triple point in a high voltage discharge section.

2. Background Art

Many electrical systems involve the use of high voltage electrodes. Examples are gas discharge switches, spark gaps, thyratron switches, and electrostatic precipitators. While the invention will be explained in terms of a gas dynamic laser system, those skilled in the art will recognize that the present invention applies equally well to each of the high voltage electrode applications described immediately above.

Gas discharge laser systems produce light by exciting the molecules of a laser gas to an elevated energy state, the excited molecules giving off the light at a characteristic frequency as the excited molecules relax to their original state. The gas molecules are excited by means of an electric field in a gas discharge region. The electric field is created by imposing a high voltage between a pair of electrodes within an enclosure containing the laser gas.

One of the two electrodes, for example, the cathode, is connected to electrical ground. The other electrode, in this example, the anode, is held at a very high voltage (e.g., 30 kilovolts) above the electrical ground. Therefore, in order to prevent breakdown of the electric field in discharge region, it is necessary to electrically insulate the anode from the surrounding components in the discharge section of the gas laser system.

In this type of an electrode structure, it is necessary that there is at least one point known as the "triple point" at which the high voltage anode, the dielectric insulating the electrode from the surrounding discharge region, and the laser gas, meet. Because of the close proximity between the electrode (at a high voltage) and the dielectric, the electric field can be very strong in the vicinity of the triple point. As a result, it is most likely that field breakdown will occur near the triple point.

In some gas laser systems, a variety of contaminants can appear in the laser gas. While these contaminants are frequently the result of a breakdown of the laser gas itself, the components constituting the discharge region can also contribute contaminants. This, of course, includes the insulator material. In addition, the discharge region can be held at a high temperature. The laser gas can also be corrosive. For example, the gas in a $CO_2$ laser would allow oxygen attachment to the insulator material. Organic materials are more subject to deterioration in a discharge region than are inorganic materials. Therefore, the insulator material should not be a plastic. Accordingly, it is particularly convenient to make the electrode and other dielectric materials from an inorganic material. Glass and ceramic material are two of the materials that are suitable for use as a dielectric. However, glass is fragile and hard to work with. In addition, it is difficult to mold most glasses.

One means of increasing the effectiveness of the discharge region is to infuse it with ions, thereby increasing the number of gas molecules that can be excited when the discharge voltage is applied across the electrodes. One common means of providing such ionization is to flood the discharge region with ionizing particles, such as electrons. Unfortunately, adding ions to the laser gas adjacent to a triple point further increases the likelihood that the electric field will breakdown at the triple point. Therefore, it is convenient to organize the geometry of the anode so that the triple point is hidden from the ionizing particles. In this way, the ionization level near the triple point is at most only slightly affected by the action of the ionizing source. This means that the likelihood of a discharge breakdown at the triple point is not significantly increased when the laser gas is ionized, as long as the triple point is sheltered from the ionizing source.

As a result of the considerations outlined above, a number of attempts have been made to overcome the problem by producing an inorganic insulator/electrode assembly that will develop very low electric field strengths near a triple point which is hidden from the ionization source. Among these attempts are the use of layered glass plates and complex ceramic bushings. An attempt was also tried to use multiple ceramics, but inconsistent coefficients of thermal expansion lead to cracking. These attempted solutions are either complicated or expensive, and thus not satisfactory.

Accordingly, it is useful to have a simple inorganic insulator/electrode assembly that will develop only relatively low electric fields near a triple point.

DISCLOSURE OF THE INVENTION

It is an object of the present invention to provide a triple point screen that is made from an inorganic material.

It is another object of the present invention to provide an inorganic triple point screen that can be easily manufactured.

Such a triple point screen can be used as a spark arrester for those applications where only inorganic material is allowed.

In one aspect, the invention is an insulator for use with an electrode of a gas discharge laser. The laser is held at a predetermined electrical potential with respect to a ground potential. The insulator comprises a block of an inorganic dielectric material and a conductive screen contained within the block of inorganic dielectric material. The screen is connected to the predetermined potential and extends in close proximity to a triple point, whereby the electric field intensity at the triple point is reduced.

BRIEF DESCRIPTION OF THE DRAWINGS

FIG. 2A is an enlarged, bottom plan view of one half of the gas discharge laser taken substantially along the line 2A—2A of FIG. 1.

FIG. 2B is an enlarged top plan view of the other half of the gas discharge laser taken substantially along the line 2B—2B of FIG. 1.

FIG. 3 is an enlarged cross-sectional view of the discharge region of a gas discharge laser system of the type shown in FIG. 1.

DETAILED DESCRIPTION OF THE PREFERRED EMBODIMENT

Figure 1:
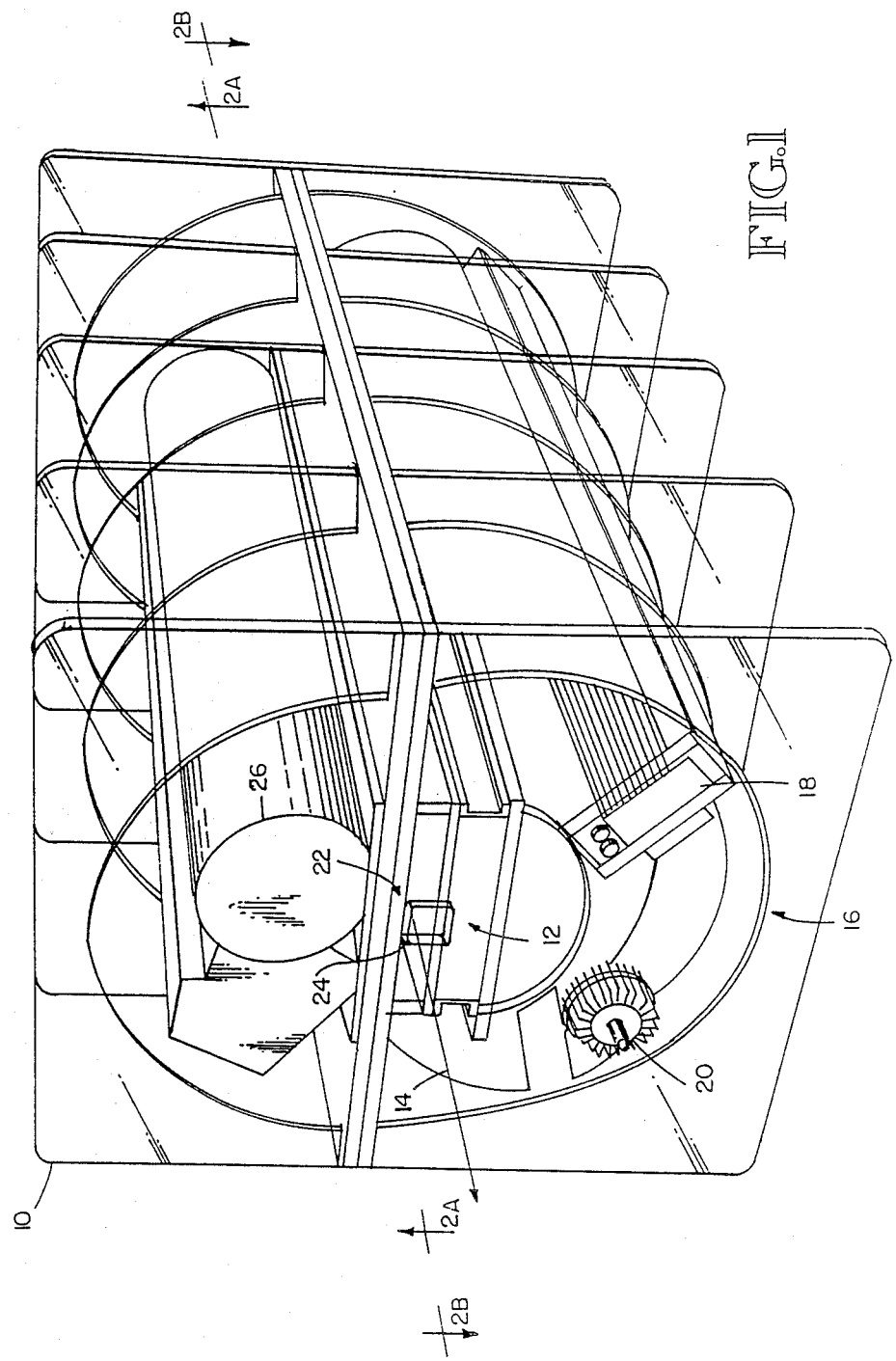
FIG. 1 is a frontal isometric view of a gas discharge laser system embodying the present invention.

Referring to FIG. 1, a gas discharger laser system 10 embodying the present invention comprises a discharge region 12 which contains an optical axis indicated by the arrow 14. The gas discharge laser system 10 is a transverse-flow gas discharge laser, requiring a gas flow duct 16, a heat exchanger 18, and a transverse fan 20. The transverse fan 20 causes the laser gas contained in the gas flow duct 18 to be recirculated from a gas flow outlet 22 of the discharge region 12 to a gas flow inlet 24 of the discharge region.

The transverse flow travels through the discharge region 12 and the gas flow duct 16 in a clockwise direction when viewed from the front. The heat generated by the discharge in the discharge region 12 is removed from the laser gas by the heat exchanger 18, so that when the laser gas is replenished to the discharge region 12, it has reached an equilibrium state.

Immediately adjacent to the discharge region 12 is a conventional electron gun 26 which generates a beam of electrons above the discharge region and transmits them into the discharge region 12 to ionize the laser gas being circulated through the discharge region.

FIG. 2A is a bottom plan view of top half of the gas discharge laser system 10 shown in FIG. 1. The view of FIG. 2A shows a cathode 30 which extends longitudinally along the optical axis 14. The cathode 30 contains a series of slots which admit the ionizing electron beam from the electron gun 26 into the discharge region 12.

FIG. 2B is a top plan view of the other half of the gas discharge laser system 10 shown in FIG. 1. The view shows an anode 32, which extends longitudinally along the optical axis 14.

FIG. 3 is a cross-sectional view of the discharge region 12 of the gas discharge laser system 10. The discharge system 10 has two electrodes, one being the cathode 30 (in the form of a grid) and the other being the anode 32 disposed on opposite sides of the optical axis 14. A foil 34, typically made from Kapton, is located to a side of the cathode 30 away from the anode 32, and defines the lower end of the electron gun 26.

The electron gun 26 produces a beam of ionizing electrons which passes through the foil 34 and the grid of the cathode 30, and then into the discharge region 12. The energy added to the discharge region 12 by the beam of ionizing electrons promotes the efficiency of the gas discharge laser system 10. The cathode 30 is connected to electrical ground.

The anode 32 is made from a conductor, such as brass. In operation, the anode 32 is connected to a discharge voltage source (not shown) capable of producing 30 kilovolts or more. Accordingly, it is important to electrically insulate the anode 32 from the surrounding components of the discharge region 12. Therefore, the anode 32 is placed on a dielectric 36. The anode 32 is electrically connected to the discharge voltage source through feed throughs 37 formed in the dielectric 36.

A "triple point" 38, briefly described above, is located at the interface between the anode 32, the dielectric 36, and the laser gas which fills the discharge region 12. As can be seen by reference to FIG. 3, the anode 32 has been designed so that the triple point 38 is protected from direct exposure to the electrons produced by the electron gun 26 by its position below the anode. This substantially reduces the chance of voltage breakdown between the anode 32 and the dielectric 36, due to a localized high electric field at the triple point 38.

While the placement of the triple point 38 as shown in FIG. 3 is helpful, this alone does not produce satisfactory results. It has been discovered that the use of a conductive metal screen 40 at the same electrical potential as the anode 32 and located within the dielectric 36 below the anode 32 and in close proximity therewith substantially reduces the electric field at the triple point 38. The screen 40 extends laterally outward beyond the periphery of the anode 32.

The metal screen 40 is particularly easy to form in the dielectric 36 when the dielectric 36 is made from an inorganic material known as MYCALEX. The reason is that the screen 40 can be molded directly into the dielectric 36, obviating the need for machining operations. A close matching of the thermal coefficients of expansion of the metal in the screen 40 and the material of the dielectric 36 allows the dielectric 36 to operate at temperatures up to its maximum temperature.

Since it is desirable to operate a gas discharge laser system 10 in as clean an environment as possible, it is preferred that the dielectric 36 be made from an inorganic material. The inorganic material is MYCALEX, which is comprised of approximately 50% mica and 50% glass. While it has been known to use organic materials, such as epoxies, for the dielectric 36, one particular advantage of the inorganic MYCALEX material as dielectric 36, such as when used to form the inorganic triple point screen described above, is that it can be molded. The MYCALEX material also has the advantage that it will withstand temperatures up to 1500 degrees Fahrenheit.

While the detailed description above has been expressed in terms of a specific example, those skilled in the art will appreciate that the invention can be used in many other circuits. In example of particular interest, this invention can be used to define graded E fields along a dielectric. Accordingly, it can be appreciated that various modifications and applications of the above-described embodiment may be made without departing from the spirit and scope of the invention. Therefore, the spirit and the scope of the present invention are to be limited only by the following claims.

We claim:

1. An insulator assembly for use with an electrode of an electrical discharge device containing a discharge gas, the electrode being held at a predetermined electrical potential with respect to a ground potential and generating an electric field adjacent the electrode, the insulator assembly comprising:

a block of an inorganic dielectric material, the block being contoured to receive the electrode and thereby defining a triple point where the dielectric material, the electrode, and the discharge gas meet, and a conductive screen positioned to a side of the block of inorganic dielectric material away from the electrode, the screen being connectable to the predetermined electrical potential and extending in close proximity to the triple point, whereby the electric field intensity at the triple point is reduced.

2. The insulator assembly of claim 1 wherein the screen is contained within the block of inorganic dielectric material.

3. The insulator assembly of claim 1 wherein the block of inorganic dielectric material provides an electrical connection of the electrode to the predetermined electrical potential.

4. The insulator assembly of claim 1 wherein the screen extends outward beyond the periphery of the electrode.

5. A gas discharge laser having a discharge region with a discharge gas therein, comprising:

a first electrode held at a ground potential, a second electrode held at a predetermined electrical potential with respect to the first electrode during the use of the laser and generating an electric field adjacent the second electrode, the second electrode having a periphery and being spaced apart from the first electrode to permit the passage of a discharge gas therebetween;

a block of an inorganic dielectric material positioned to electrically isolate the second electrode from the ground potential, the block being contoured to receive the second electrode and to thereby define a triple point where the dielectric material, the second electrode, and the discharge gas meet; and an electrically conductive screen positioned to a side of the block of inorganic dielectric material away from the first electrode, the screen being connectable to the predetermined electrical potential and extending in close proximity to the triple point, whereby the electric field intensity at the triple point is reduced.

6. The laser of claim 5 wherein the screen is contained within the block of inorganic dielectric material.

7. The laser of claim 5 wherein the screen extends outward beyond the periphery of the second electrode.

8. In a gas discharge laser having a discharge region with a discharge gas therein, and having a first electrode, a second electrode held at a predetermined electrical potential with respect to the first electrode during use of the laser and generating an electric field adjacent the second electrode, the second electrode having a periphery and being spaced apart from the first electrode to permit the passage of a discharge gas therebetween, and a block of an inorganic dielectric material positioned to electrically isolate the first electrode from the second electrode, the block being contoured to receive the second electrode and to thereby define a triple point where the dielectric material, the second electrode, and the discharge gas meet, the improvement wherein the block of inorganic dielectric material has a conductive screen positioned to a side of the block of inorganic dielectric material away from the first electrode, the screen being connectable to the predetermined electrical potential and extending in close proximity to the triple point, whereby the electric field intensity at the triple point is reduced.

9. The improvement of claim 8, wherein the screen is contained within the block of inorganic dielectric material.

10. The improvement of claim 8 wherein the screen extends outward beyond the periphery of the second electrode.

* * * * *